United States Patent
Angelo et al.

(10) Patent No.: US 7,411,752 B2
(45) Date of Patent: Aug. 12, 2008

(54) HEAD VIBRATION DETECTION DEVICE AND METHOD

(75) Inventors: James E. Angelo, Falcon Heights, MN (US); John S. Wright, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 252 days.

(21) Appl. No.: 09/469,597

(22) Filed: Dec. 22, 1999

(65) Prior Publication Data

US 2003/0011914 A1    Jan. 16, 2003

Related U.S. Application Data

(60) Provisional application No. 60/121,157, filed on Feb. 22, 1999.

(51) Int. Cl.
*G11B 5/02*    (2006.01)

(52) U.S. Cl. .......................... 360/25; 360/75

(58) Field of Classification Search .................. 360/25, 360/75, 77.16, 74.5, 77.02, 77.03, 78.05, 360/78.09

See application file for complete search history.

(56) References Cited

U.S. PATENT DOCUMENTS

| | | | | |
|---|---|---|---|---|
| 3,688,287 A | * | 8/1972 | Perry | .................. 340/174.1 E |
| 4,532,802 A | * | 8/1985 | Yeack-Scranton et al. | . 73/432 R |
| 4,853,810 A | | 8/1989 | Pohl et al. | .................. 360/103 |
| 4,868,447 A | * | 9/1989 | Lee et al. | ..................... 310/328 |
| 5,021,906 A | | 6/1991 | Chang et al. | ................ 360/103 |
| 5,276,573 A | | 1/1994 | Harada et al. | ............... 360/103 |
| 5,305,294 A | * | 4/1994 | Kime et al. | .............. 369/13.17 |
| 5,777,815 A | * | 7/1998 | Kasiraj et al. | ................. 360/75 |
| 5,825,181 A | | 10/1998 | Schaenzer et al. | ........... 324/212 |
| 5,862,015 A | | 1/1999 | Evans et al. | ................. 360/104 |
| 6,101,058 A | * | 8/2000 | Morris | ........................ 360/69 |
| 6,166,874 A | * | 12/2000 | Kim | ........................... 360/75 |
| 6,362,542 B1 | * | 3/2002 | Novotny | ...................... 310/12 |
| 6,667,844 B1 | * | 12/2003 | Yao et al. | ....................... 360/75 |

FOREIGN PATENT DOCUMENTS

WO    WO 98/44488    10/1998

OTHER PUBLICATIONS

U.S. Appl. No. 09/475,362, filed Dec. 30, 1999, Morris et al.

* cited by examiner

*Primary Examiner*—Andrea Wellington
*Assistant Examiner*—Varsha A Kapadia
(74) *Attorney, Agent, or Firm*—Westman, Champlin & Kelly, P.A.

(57) ABSTRACT

A disc drive including a transducer supported on the head suspension assembly to induce a transducer signal in response to head vibration. The transducer signal is level detected to output a level detected signal indicative of head vibration. A method for detecting head vibration via a transducer on a head suspension assembly. The transducer on the head suspension assembly operating between a detection mode and an actuator mode for selectively detecting vibration and actuating the head.

26 Claims, 8 Drawing Sheets

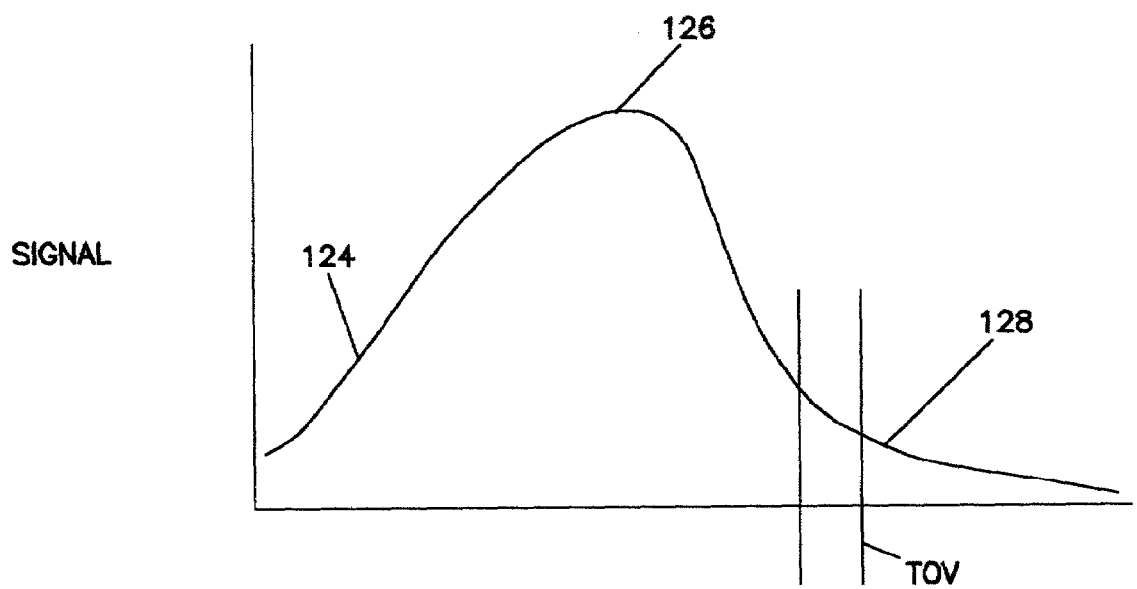

HEAD VIBRATION DETECTION DEVICE AND METHOD

CROSS-REFERENCE TO RELATED APPLICATION

The present application claims priority to U.S. Provisional Application Ser. No. 60/121,157, filed Feb. 22, 1999 and entitled "USING A PZT MICROACTUATOR TO SENSE HEAD/DISC CONTACT".

FIELD OF THE INVENTION

The present invention relates to a data storage system. In particular, the present invention relates to an assembly for monitoring head vibration for a data storage system.

BACKGROUND OF THE INVENTION

Disc drives are used to store digitally encoded information on discs. Transducer elements read data from and write data to disc supported for rotation by a spindle motor. Transducer elements are supported above the disc surface by a head suspension assembly. Heads are positioned relative to data tracks via a voice coil motor. Disc drive density is increasing necessitating increased head positioning accuracy. Microactuators are used with a voice coil motor for adjusting head position for track placement. Microactuators include piezoelectric transducers on a head suspension assembly which receive a signal command from a controller to actuate the head.

Surfaces of the discs include asperities and other defects due to variations in the manufacturing process or created during shipping and handling or operation and use of the disc drive. During read write operations a head may contact asperities on the disc surface interfering with read/write operations. Contact between the head and disc surface can damage the disc surface and result in permanent data loss for a write command. Prior disc drives incorporate acoustic emission sensors attached to an E-block arm to determine head-disc contact. A sensor attached to an E-block arm sense head disc contact for some head on the E-block however its difficult to distinguish which head-disc interface is contacting. The present invention addresses these and other problems, and offers other advantages over prior art.

SUMMARY OF THE INVENTION

The present invention relates to a disc drive including a transducer supported on the head suspension assembly to induce a transducer signal in response to head vibration. The transducer signal is level detected to output a level detected signal indicative of head vibration. These and other beneficial features of the present invention will become apparent upon review of the following FIGS. and related explanations.

BRIEF DESCRIPTION OF THE DRAWINGS

FIG. 5 illustrates a vibration signal for slider "take-off".

DETAILED DESCRIPTION OF THE PREFERRED EMBODIMENTS

Figure 1:
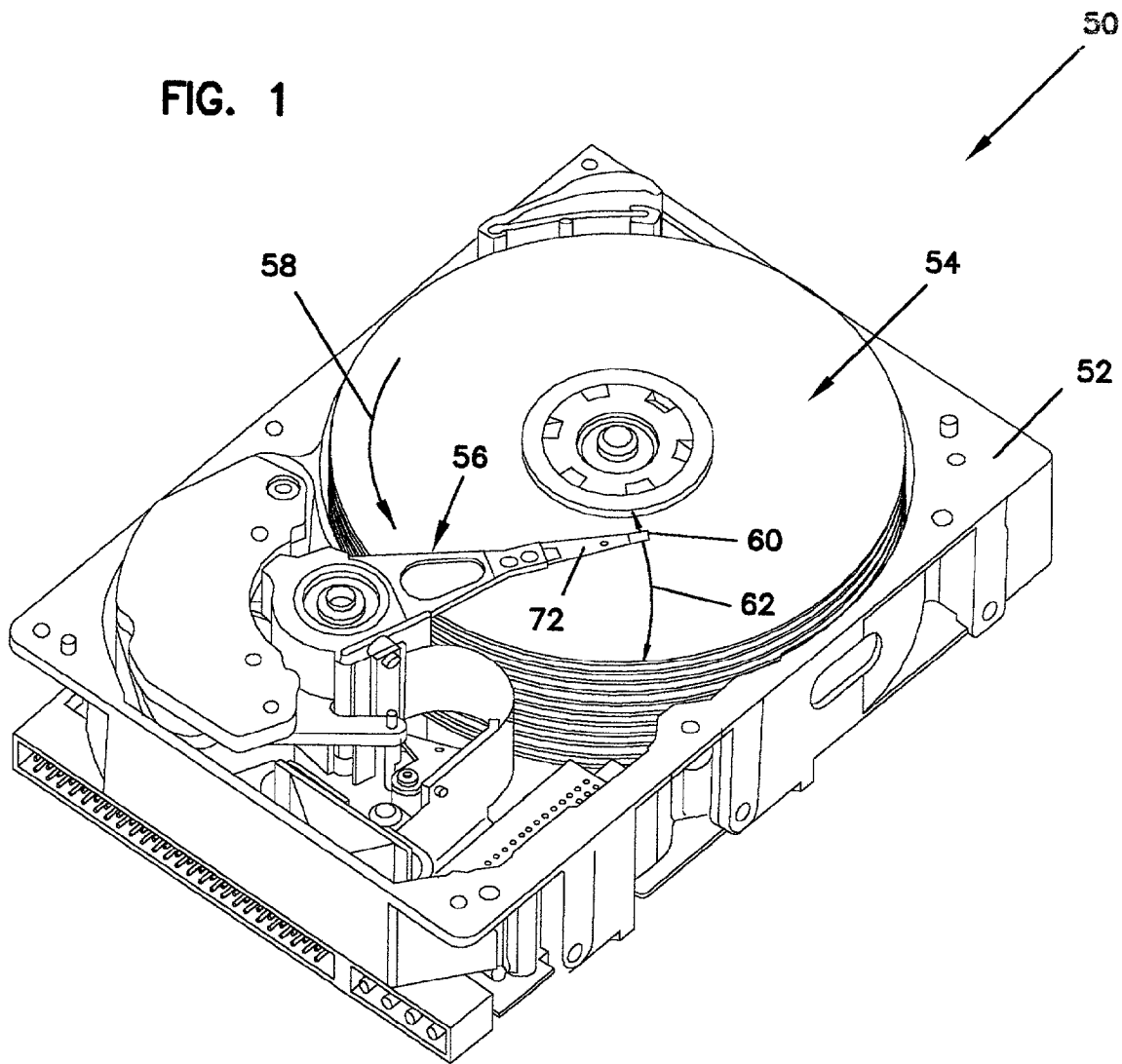
FIG. 1 is a perspective illustration of an embodiment of a disc drive.

FIG. 1. illustrates a disc drive 50 including a chassis 52, discs 54, and actuator assembly 56. Discs 54 are rotationally coupled to chassis 52 via a spindle motor (not shown) for rotation, as illustrated by arrow 58. Actuator assembly 56 rotationally supports heads 60 as illustrated by arrow 62 for reading and/or writing data to and from discs 54. Heads include transducer elements supported by a slider. For proximity or near proximity recording the slider flies above the disc surface. Rotation of the disc creates an air flow under an air bearing surface of the slider so that the slider "takes off" from the disc surface. Vibration or shock to the disc drive or asperities in the disc surface can cause the slider to contact or slam into the disc surface during read and write operations. Head disc contact can damage the disc surface and can interfere with a read/write command resulting in permanent data loss for a write command.

Figure 2:
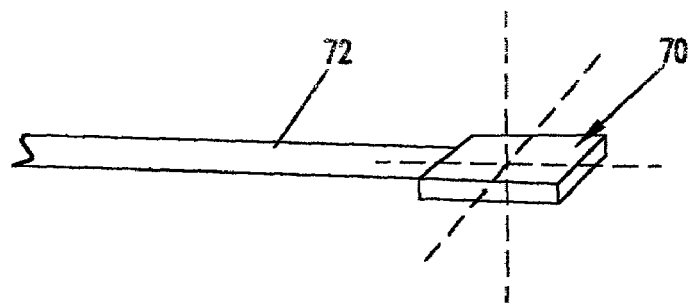
FIG. 2 is a schematic illustration of head vibration modes.

FIG. 2 diagrammatically illustrates a slider 70 supported relative to a flexible head suspension assembly 72 illustrated diagrammatically in FIG. 2. Head disc contact causes the slider to vibrate or move. Modes of vibration or movement of the slider 70 include bending mode vibration and torsion mode vibration. Vibration at the natural frequency of the slider or air bearing amplifies the motion of the slider. The present invention relates to a head vibration detector on the head suspension assembly for detecting vibration of the supported head or its air bearing.

Figure 3:
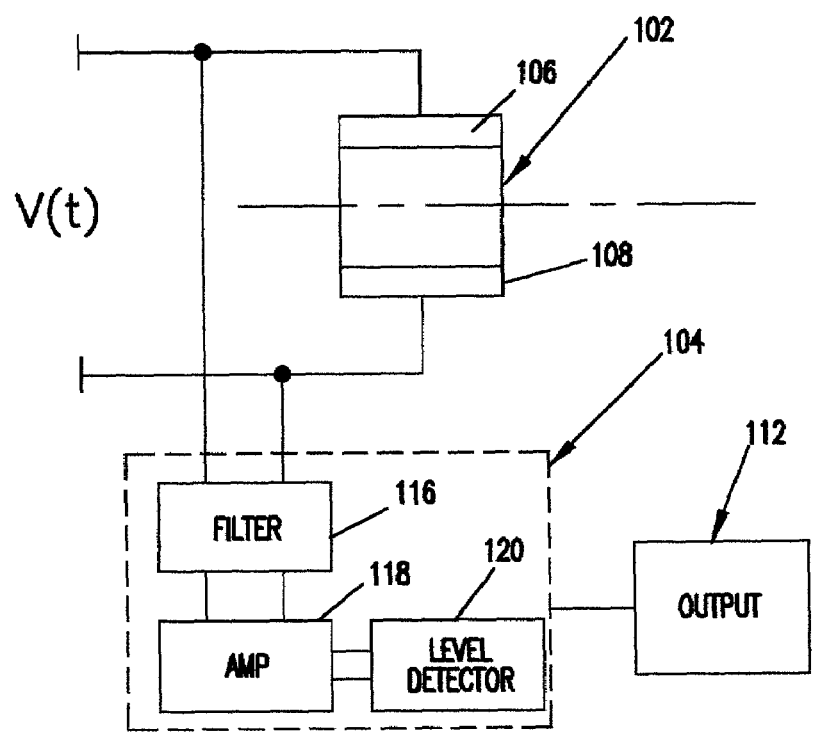
FIG. 3 is an illustration of an embodiment of a head vibration detector of the present invention.

In the embodiment illustrated in FIG. 3, head vibration is detected by transducer 102 supported on a movable head suspension assembly and detector 104. Opposed terminals 106, 108 of the transducer 102 are oriented so that vibration or movement of the transducer along a detection axis induces a transducer signal or voltage signal across terminals 106, 108. The transducer 102 can be oriented for detecting various vibration modes of the head or air bearing.

Figure 4:
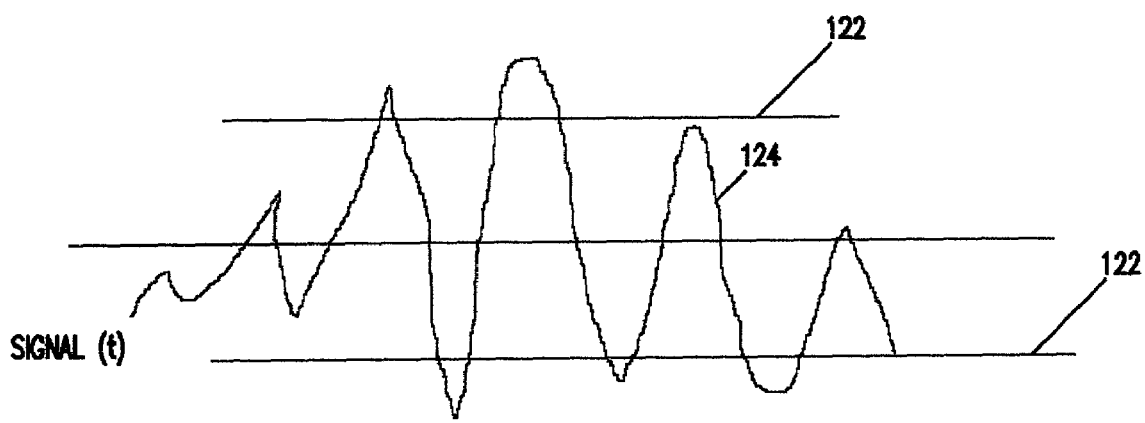
FIG. 4 is an illustration of a threshold level detection for a transducer signal.

As shown in FIG. 3, detector 104 receives a transducer signal and outputs a level detected signal indicative of head vibration as illustrated by block 112 as will be explained. In the embodiment illustrated in FIG. 3, detector 104 includes a filter 116, an amplifier 118 and level detector 120. The transducer signal is filtered to pass vibration mode frequencies for detecting at least one vibration mode. In one embodiment, filter 116 passes vibration mode frequencies for at least one of torsion or bending mode vibration. The signal is amplified by amplifier 118 and is passed through level detector 120 to output the level detected signal indicative of the vibration mode of the head. In particular, as shown in FIG. 4, the level detector 120 passes a threshold signal amplitude 122 for transducer signal 124 to output a level detected signal indicative of head vibration.

The head vibration detector can be used for testing head disc contact for design analysis or for drive diagnostics. For example, detector can be used for mapping drive asperities, bad disc sectors or analyzing handing damage. Thus the level detector 120 detects a threshold signal amplitude measuring head disc contact. Alternatively, the head vibration detector can be used for measuring takeoff velocity (TOV) for design analysis as illustrated in FIG. 5. As shown, prior to "take-off" the level detected signal amplitude 126 is large indicative of the vibrational motion of the slider and air bearing and at "take-off" signal amplitude 128 is reduced.

Figure 6:
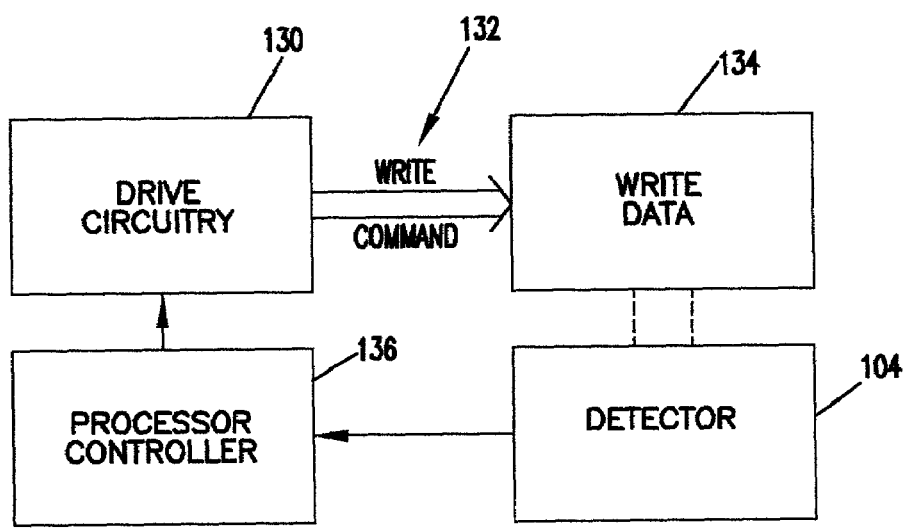
FIG. 6 is a schematic illustration of a process controller coupled to a detector for executing a write recovery algorithm for head vibration.

The head vibration detector can be implemented for write operations as illustrated in FIG. 6. As previously explained, contact or interference between the head and disc during a write operation can interfere with write operations resulting in permanent loss of the write data since once the write command is executed, the data is no longer available in drive memory. Verification of the write data by a readback process where the drive reads back the data from the disc surface to confirm the integrity of the data slows operation of the disc drive.

For write process control, detector 104 outputs a level detected signal 112 for controlling write operations. Thus, as illustrated in FIG. 6, for write operations, drive controller 130 executes a write command 132 to write data to the disc surface as illustrated by block 134. As illustrated schematically, during write operations, the level detected signal is monitored by process controller 136. Process controller is configured to receive the level detected signal from detector 104 and execute a recovery algorithm to rewrite the data in drive memory to assure that the data in drive memory is not lost or corrupted due to vibration or head contact. Transducer 102 can be a piezoelectric or electrostatic transducer for producing a transducer signal proportional to mechanical movement of the head suspension assembly 72 induced by head vibration.

Figure 7:
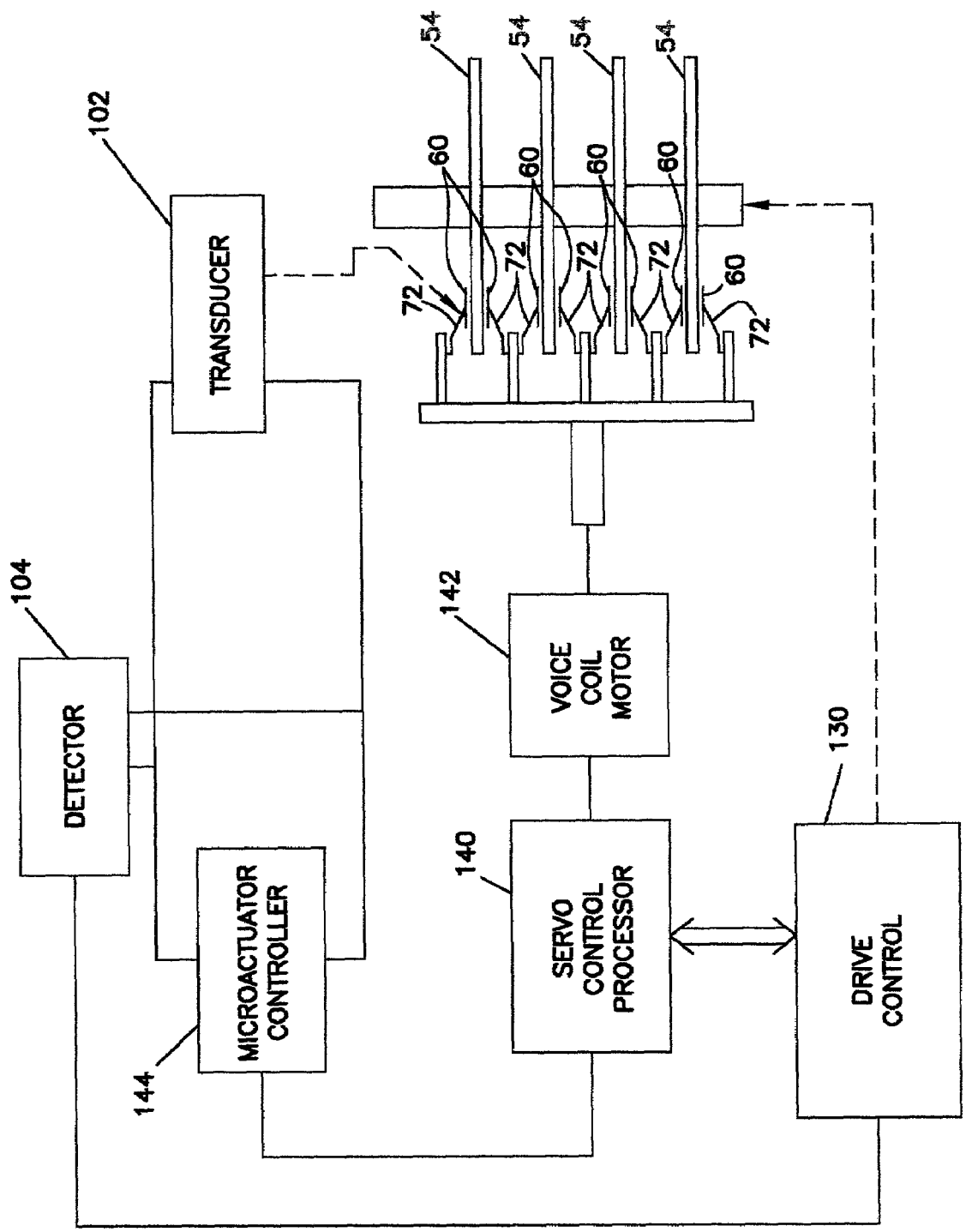
FIG. 7 is a schematic of control circuitry for a disc drive operably in a detection mode and an actuator mode.

In one embodiment, the transducer operates between a detection mode and an actuator mode. In the detection mode, the transducer is used to detect head vibration as previously explained, and in the actuator mode, the transducer receives a signal to move or actuate the head. FIG. 7 schematically illustrates process control circuitry for a disc drive operable between a detection mode and an actuator mode. For read/write operations, drive circuitry 130 provides a position signal to servo control processor 140 to operate voice coil motor 142 for head placement and provides a read write command to heads. As shown, transducer 102 is coupled to the suspension assembly of the heads so that vibration of the heads strains the transducer to produce a transducer signal. In the detection mode, detector 104 receives the transducer signal and outputs a level detected signal indicative of head vibration. In the actuation mode, a microactuator controller 144 transmits a signal to the transducer 102 to adjust the dimensions of the transducer 102 providing for fine head placement capabilities.

Figure 8:
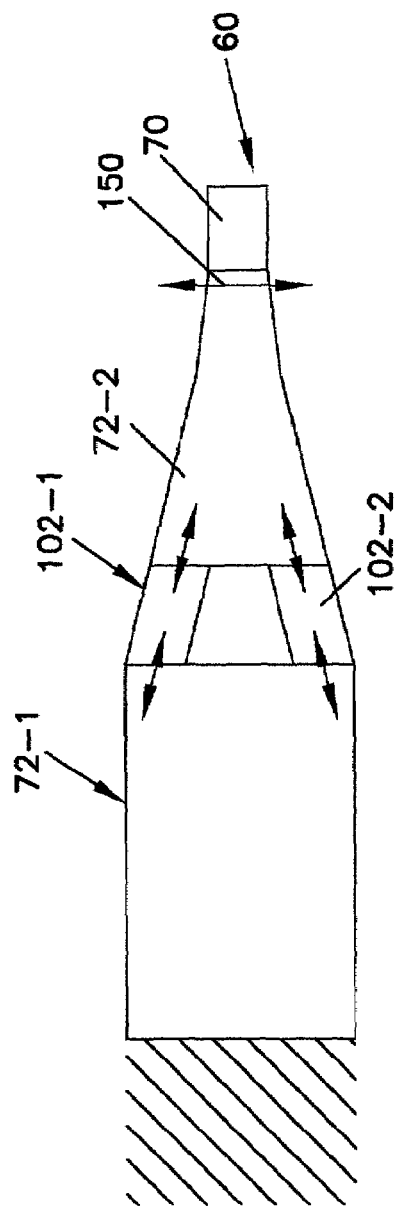
FIG. 8 is a top view of an embodiment of a suspension mounted transducer for operation of the present invention.
Figure 9:
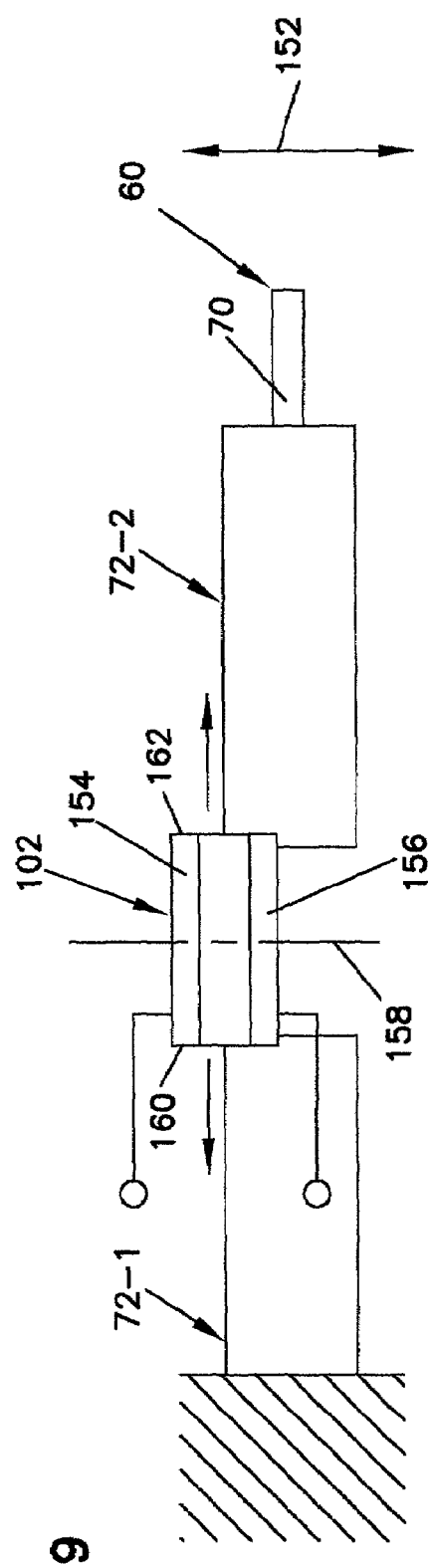
FIG. 9 is a side view of the suspension mounted transducer of FIG. 8.

FIGS. 8-9 schematically illustrate an embodiment of a suspension based transducer 102 configured to laterally move heads as illustrated by arrow 150 in an actuation mode and configured to detect head vibration in the detection mode. As shown, transducer 102 is aligned so that opposed terminal are formed between upper and lower terminal plates 154, 156 shown in FIG. 9 to provide a potential or voltage along a vertical axis 158 between terminals 154, 156. A potential across terminal plates 154, 156 provides mechanical movement along a transverse axis to axis 158, or length of transducer 102 between opposed ends 160, 162.

In the embodiment shown, opposed ends 160, 162 of transducer 102 flexibly couple a first suspension portion 72-1, rigidly connected to an actuator block illustrated diagrammatically, and a second suspension portion 72-2 supporting the heads 60 so that when a transducer signal is supplied to opposed terminals 154, 156, the length between ends 160, 162 expands and contracts depending upon the direction of the signal to laterally shift the position of the second suspension portion 72-2 relative to the first suspension portion 72-1 to actuate the heads as illustrated by arrow 150.

In the detection mode, opposed terminal plates 154, 156 are aligned so mechanical movement of the transducer 102 induces a potential across terminals 154, 156 for detecting vibration modes including torsion and bending modes of the head or its air bearing. As previously explained, the signal is filtered to pass a vibration mode frequency and level detected to output a level detected signal indicative of vibration.

Figure 10:
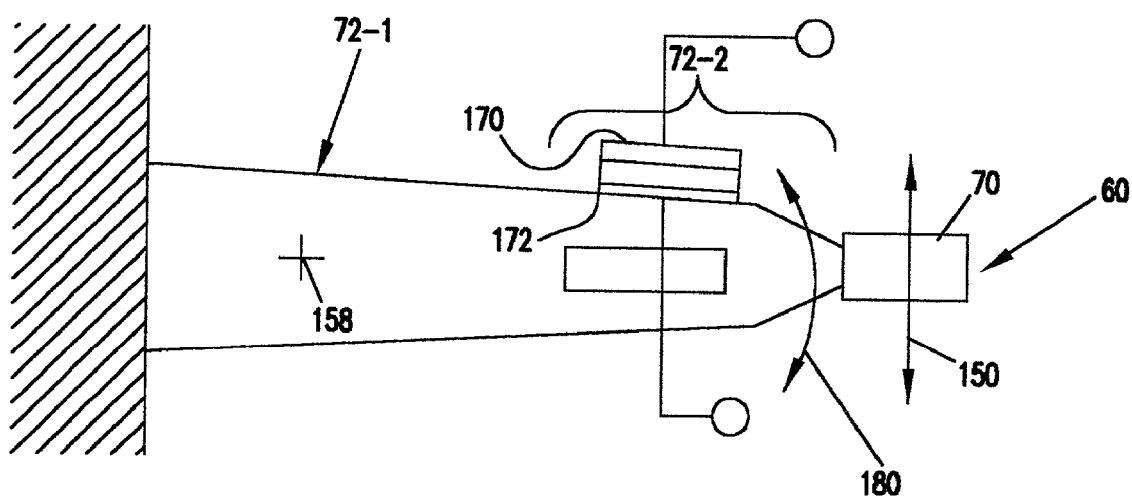
FIG. 10 is a top view of an alternate embodiment of a suspension mounted transducer for operation of the present invention.

FIG. 10 is a top plan view schematically illustrating an alternate embodiment of a suspension based transducer configured to microactuate a head as illustrated by arrow 150 in an actuation mode and aligned to induce a transducer signal for detecting head vibration in the detection mode. As shown, transducer terminals 170, 172 are aligned transverse to vertical axis 158 and the transducer is connected in longitudinal alignment along its length with a portion of the suspension assembly. The suspension portion is structurally designed to bend as illustrated by arrow 180 relative to a fixed portion to move the head in the actuation mode. Similarly vibration or mechanical movement of the head induces a transducer or voltage signal across terminals 170, 172 which is level detected to output a signal indicative of head vibration.

Figure 11:
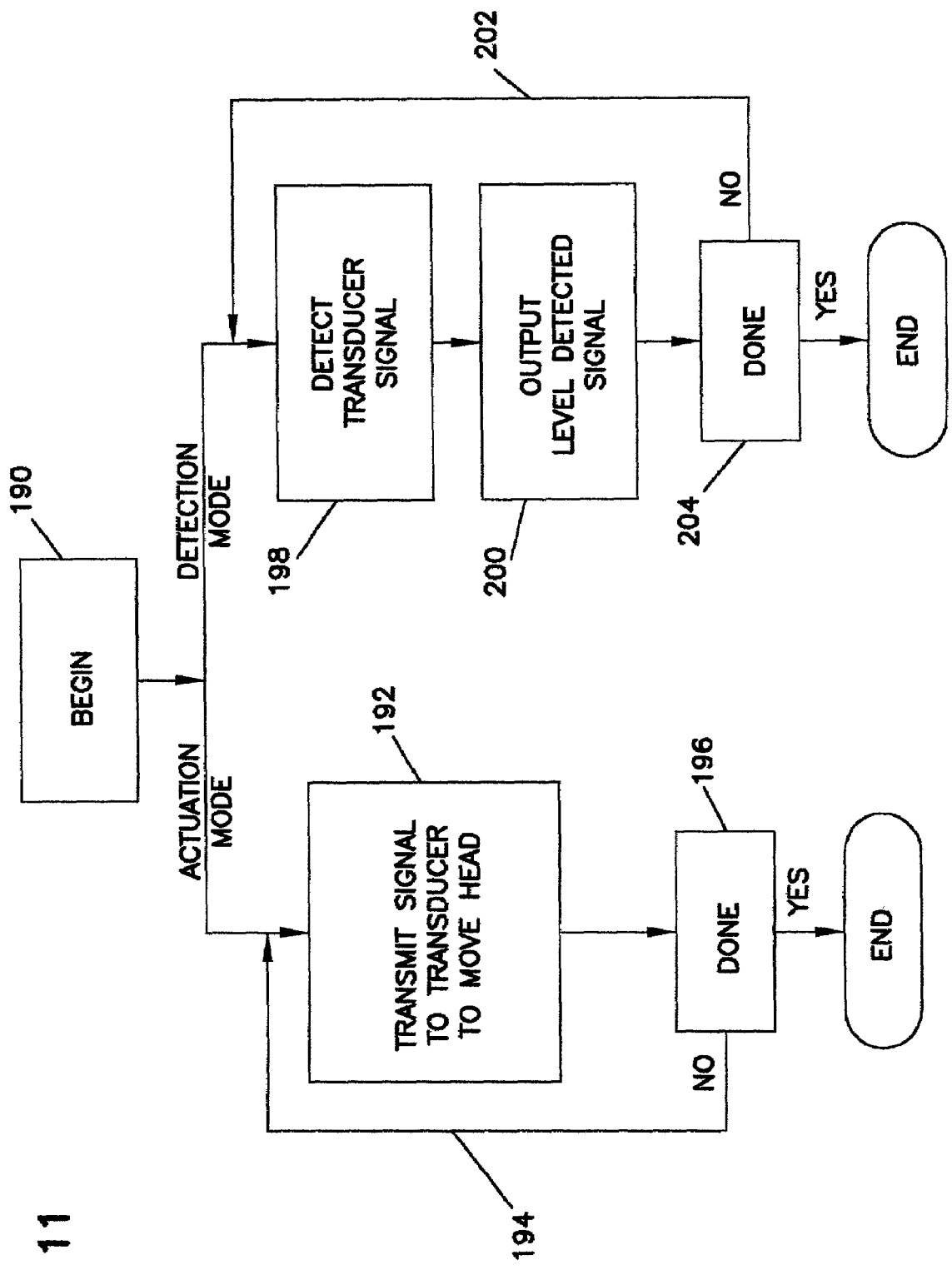
FIG. 11 is a flow chart illustrating operation in an actuation mode and a detection mode.

FIG. 11 is a flow chart illustrating operation in an actuation mode and a detection mode. As shown in the actuation mode, a microactuator controller 144 transmits a signal to the transducer 102 to move the head as illustrated by block 192. Operation continues as illustrated by line 194 until done as illustrated by block 196. For operation in the detection mode, the detector 104 detects a transducer signal as illustrated by block 198 and the transducer signal is level detected to output a level detected signal as illustrated in block 200. Detection operation continues as illustrated by line 202 until done 204.

A disc drive including a transducer 102 supported on the head suspension assembly 72 to induce a transducer signal in response to head vibration. The transducer signal is level detected to output a level detected signal 112 indicative of head vibration.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to other systems, like an optical system, without departing from the scope and spirit of the present invention.

What is claimed is:

1. A disc drive comprising:
   a disc rotationally coupled to a chassis;
   a movable head suspension assembly having a head coupled thereto movable relative to a surface of the disc;
   a transducer supported on the movable head suspension assembly and configured to induce a transducer signal proportional to movement of the head;
   a vibration detector configured to detect a transducer signal amplitude above a threshold amplitude and output a level detected signal indicative of head vibration.

2. The disc drive of claim 1 wherein the level detected signal is indicative of head-disc contact.

3. The disc drive of claim 1 wherein the vibration detector includes a frequency filter.

4. The disc drive of claim 3 wherein the frequency filter is configured to detect at least one of a bending mode or torsion mode.

5. The disc drive of claim 1 wherein the transducer is a piezoelectric material.

6. The disc drive of claim 1 wherein the transducer is an electrostatic transducer.

7. The disc drive of claim 1 and further comprising:
   a process controller coupled to the detector and configured to receive the outputted level detected signal and output a process command to reexecute a write command in drive memory.

8. The disc drive of claim 1 and further comprising:
   a controller coupled to the transducer on the movable head suspension assembly and configured to transmit a signal to the transducer to move the head.

9. The disc drive of claim 1 wherein the disc drive includes a plurality of discs rotationally coupled to the chassis and a plurality of movable head suspension assemblies having heads coupled thereto to read or write to surfaces of the plurality of discs and including a transducer coupled to each of the plurality of movable head suspension assemblies.

10. The disc drive of claim 9 wherein the transducer is configured to operate between a detection mode and an actuation mode, in the detection mode, the transducer detecting the vibration associated with the head suspension assembly and in the actuation mode the transducer receiving a signal to energize the transducer to move a head of the head suspension assembly.

11. The disc drive of claim 10 including:
    a microactuator controller coupled to the transducer and configured to operate the transducer in the actuation mode.

12. A method for operating a disc drive comprising steps of:
    (a) providing a transducer supported on a movable head suspension assembly having a head coupled thereto configured to generate a transducer signal indicative of head vibration; and
    (b) detecting a signal amplitude of the transducer signal above a threshold amplitude and outputting a level detected signal indicative of the head vibration.

13. The method of claim 12 wherein the transducer is a piezoelectric transducer.

14. The method of claim 12 and further comprising the step of:
    (c) transmitting a signal to the transducer on the movable suspension assembly to move the head.

15. The method of claim 12 and further comprising the step of:
    (c) transmitting a command to rewrite a write command in drive memory in response to the level detected signal indicative of the head vibration.

16. The method of claim 12 and comprising the step of
    (c) filtering the transducer signal to detect vibration frequencies of the head.

17. The method of claim 12 wherein the disc drive includes a plurality of head suspension assemblies and further comprising:
    (c) individually detecting the head vibration for each of the plurality of head suspension assemblies.

18. The method of claim 12 including a microactuator controller coupled to the transducer and configured to transmit a signal to the transducer to move the head and comprising the step of:
    (c) selectively operating the disc drive in a detection mode and an actuation mode, in the detection mode the transducer detecting the head vibration and in the actuation mode, the transducer moving the head.

19. The method of claim 12 and comprising the step of:
    (c) filtering the transducer signal to detect one of bending or torsion mode vibration frequencies.

20. A drive assembly comprising:
    a movable head suspension assembly; and
    a detector coupled to a transducer on the movable head suspension assembly that provides a signal indicative of a vibration associated with the head suspension assembly and the detector outputs a level detected signal that is responsive to the vibration being greater than a threshold value.

21. The assembly of claim 19 in which the vibration is caused by head vibration.

22. The assembly of claim 19 wherein the detector includes a filter configured to pass a signal responsive to vibration frequencies associated with the head suspension assembly.

23. An assembly comprising:
    a movable suspension assembly;
    transducer coupled to the movable suspension assembly and comprising an actuation mode in which the transducer actuates the movable suspension assembly and a detection mode in which the transducer induces a transducer signal proportional to vibration of the movable suspension assembly; and
    a detector coupled to the transducer and configured to receive the transducer signal from the transducer that is proportional to vibration of the movable suspension assembly in the detection mode.

24. The assembly of claim 23 wherein the transducer comprises one of a piezoelectric or electrostatic actuator.

25. The assembly of claim 23 and further comprising:
    a controller coupled to the transducer and configured to transmit a signal to the transducer to move the movable suspension assembly.

26. The assembly of claim 23 including a controller configured to operate the actuator transducer between the actuation mode to position a head of the movable suspension assembly and the detection mode to detect vibration of the head of the movable suspension assembly.

* * * * *